United States Patent
Yu et al.

(10) Patent No.: US 11,772,507 B1
(45) Date of Patent: Oct. 3, 2023

(54) ENERGY FACILITY LEVERAGING ELECTRIC VEHICLE CHARGING TO INCREASE USAGE OF RENEWABLE ENERGY

(71) Applicant: Ford Global Technologies, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/852,052

(22) Filed: Jun. 28, 2022

(51) Int. Cl.
| | |
|---|---|
| *B60L 53/51* | (2019.01) |
| *H02J 3/00* | (2006.01) |
| *H02J 7/34* | (2006.01) |
| *H02J 7/00* | (2006.01) |
| *H02J 7/35* | (2006.01) |
| *B60L 53/53* | (2019.01) |
| *B60L 58/12* | (2019.01) |

(52) U.S. Cl.
CPC ............... *B60L 53/51* (2019.02); *B60L 53/53* (2019.02); *B60L 58/12* (2019.02); *H02J 3/004* (2020.01); *H02J 7/0013* (2013.01); *H02J 7/0048* (2020.01); *H02J 7/342* (2020.01); *H02J 7/35* (2013.01); *H02J 2300/24* (2020.01)

(58) Field of Classification Search
CPC .......... B60L 53/51; B60L 53/53; B60L 58/12; H02J 7/0048; H02J 7/342; H02J 7/0013; H02J 7/35; H02J 3/004; H02J 2300/24
USPC .................................................. 307/9.1, 10.1
See application file for complete search history.

(56) References Cited

U.S. PATENT DOCUMENTS

| | | | |
|---|---|---|---|
| 9,365,116 | B2 | 6/2016 | Staley et al. |
| 10,737,577 | B2 | 8/2020 | Kapadia et al. |
| 11,267,358 | B2 | 3/2022 | Smolenaers |
| 11,283,262 | B2 | 3/2022 | Arslan et al. |
| 2021/0362614 | A1* | 11/2021 | Carr ........................ B60L 53/53 |

* cited by examiner

*Primary Examiner* — Hal Kaplan
(74) *Attorney, Agent, or Firm* — David B. Kelley; Brooks Kushman P.C.

(57) ABSTRACT

An energy facility, such as a charge station operable for charging electrified vehicles, includes a controller. The controller controls the energy facility to charge at a current time an EV present at the charge station with electricity stored in an onsite battery of the charge station in response to an amount of renewable energy expected to be available at the charge station at a future time during which the EV is expected to not be present at the charge station exceeding an available electricity storage capacity of the onsite battery.

20 Claims, 5 Drawing Sheets

ENERGY FACILITY LEVERAGING ELECTRIC VEHICLE CHARGING TO INCREASE USAGE OF RENEWABLE ENERGY

TECHNICAL FIELD

The present disclosure relates to an energy facility such as a charge station having a renewable energy source and a stationary energy storage device and being operative for charging an electrified vehicle.

BACKGROUND

An electrified vehicle (EV) includes a traction battery for outputting electrical energy to propel the EV. An energy facility may charge the traction battery with electrical energy when the EV is at the energy facility. The energy facility may obtain electrical energy from a renewable energy source and may include a stationary energy storage device for storing electrical energy.

SUMMARY

An object includes controlling an energy facility, such as a charge station, having a renewable energy source, such as solar or wind power, and a stationary energy storage device, such as an onsite battery, to leverage charging of an electrified vehicle (EV) to thereby increase usage of renewable energy by the energy facility.

A charge station having a controller is provided. The controller is configured to charge at a current time an EV present at the charge station with electricity stored in an onsite battery of the charge station in response to an amount of renewable energy expected to be available at the charge station at a future time during which the EV is expected to be absent from (i.e., expected to not be present at) the charge station exceeding an available electricity storage capacity of the onsite battery.

The controller is further configured to charge at the current time the EV with electricity stored in the onsite battery in response to the amount of renewable energy expected to be available exceeding the available electricity storage capacity of the onsite battery summed with an amount of electricity expected to be provided by the charge station to other loads at the future time.

The controller is further configured to charge at the current time the EV with electricity stored in the onsite battery in response to the amount of renewable energy expected to be available exceeding the available electricity storage capacity of the onsite battery summed with an amount of electricity expected to be provided by the charge station to other loads at the future time and a state-of-charge (SOC) of the onsite battery at the current time being greater than a target SOC of the onsite battery.

The controller is further configured to charge at the current time the EV with electricity stored in the onsite battery in response to the amount of renewable energy expected to be available exceeding the available electricity storage capacity of the battery and the EV being not fully charged.

The controller is further configured to charge at the current time the EV with electricity stored in the onsite battery in response to the amount of renewable energy expected to be available exceeding the available electricity storage capacity of the onsite battery and a SOC of the EV at the current time being less than a target SOC of the EV and/or a SOC of the onsite battery at the current time being greater than a target SOC of the onsite battery.

An energy facility having a renewable energy generator, an energy storage device, and a controller is provided. The renewable energy generator is operable for generating electrical energy from a renewable energy source. The energy storage device is operable for storing electrical energy generated by the renewable energy generator. The controller is configured to charge at a current time a traction battery of an EV present at the energy facility with electrical energy stored in the energy storage device in response to an amount of electrical energy expected to be generated by the renewable energy generator at a future time during which the EV is expected to not be present at the energy facility exceeding an available electrical energy storage capacity of the energy storage device.

The renewable energy generator may be a solar panel assembly with the renewable energy source being solar power.

The energy storage device may be a battery that is onsite at the energy facility (i.e., an onsite battery).

A method of operating an energy facility having a renewable energy generator for generating electrical energy from a renewable energy source and an energy storage device for storing electrical energy generated by the renewable energy generator is provided. The method includes charging at a current time a traction battery of an EV present at the energy facility with electrical energy stored in the energy storage device in response to an amount of electrical energy expected to be generated by the renewable energy generator at a future time during which the EV is expected to not be present at the energy facility exceeding an available electrical energy storage capacity of the energy storage device.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
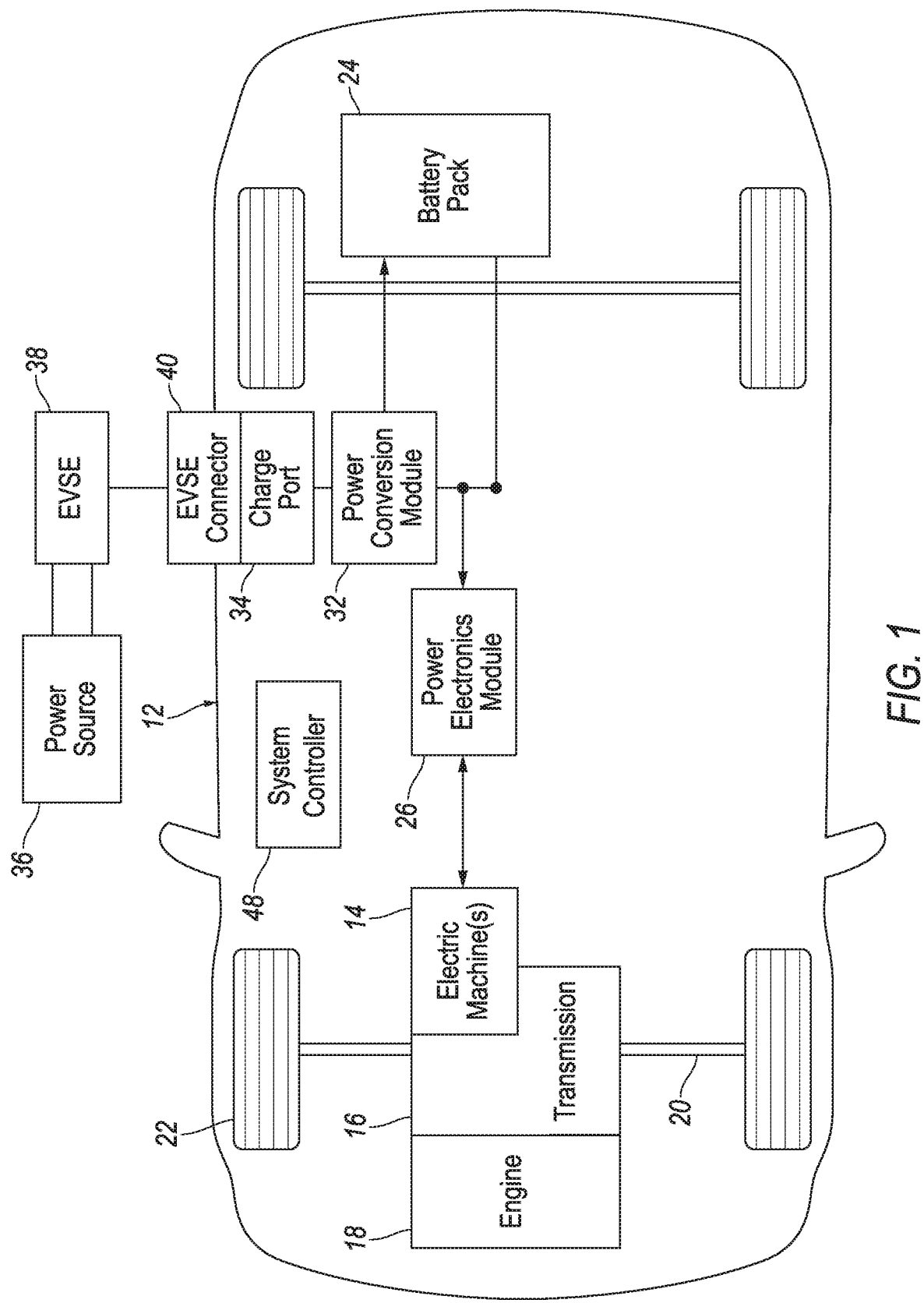
FIG. 1 illustrates a block diagram of an electrified vehicle (EV) having a traction battery.

Referring now to FIG. 1, a block diagram of an exemplary electrified vehicle (EV) 12 is shown. In this example, EV 12 is a plug-in hybrid electric vehicle (PHEV) having an engine 18 and a traction battery (or "battery pack") 24. In other embodiments, EV 12 is battery electric vehicle (BEV). In a BEV configuration, EV 12 does not include engine 18.

EV 12 includes one or more electric machines 14 mechanically connected to a transmission 16. Electric machine 14 is capable of operating as a motor and as a generator. Transmission 16 is mechanically connected to engine 18 and to a drive shaft 20 that is mechanically connected to wheels 22 of EV 12. Electric machine 14 can provide propulsion capability while engine 18 is turned on or off. Electric machine 14 acting as a generator can recover energy that may normally be lost as heat in a friction braking system.

Traction battery 24 stores electrical energy that can be used by electric machine 14 for propelling EV 12. Traction battery 24 typically provides a high-voltage (HV) direct current (DC) output. Traction battery 24 is electrically connected to a power electronics module 26 which is electrically connected to electric machine 14. Power electronics module 26 provides the ability to bi-directionally transfer energy between traction battery 24 and electric machine 14. For example, traction battery 24 may provide a DC voltage while electric machine 14 may require a three-phase alternating current (AC) current to function. Power electronics module 26 may convert the DC voltage to a three-phase AC current to operate electric machine 14. In a regenerative mode, power electronics module 26 may convert three-phase AC current from electric machine 14 acting as a generator to DC voltage compatible with traction battery 24.

Traction battery 24 is rechargeable by an external power source 36. External power source 36 may be a connection to an electrical outlet. External power source 36 may be an electrical power distribution network or grid as provided by an electric utility company. External power source 36 may be electrically connected to a charger or electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32 of EV 12 may condition electric power supplied from EVSE 38 to provide the proper voltage and current levels to traction battery 24. Power conversion module 32 may interface with EVSE 38 to coordinate the delivery of electric power to traction battery 24. Additionally, EV 12 may be configured to provide electric power from traction battery 24 to external power source 36 via EVSE 38 and EVSE connector 40. Transferring electric power from traction battery 24 to external power source 36 may require utilizing power conversion module 32 as external power source 36 may be on AC power only. Further, traction battery 24 may be directly connected to charge port 34 to transfer and/or receive DC power.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Figure 2:
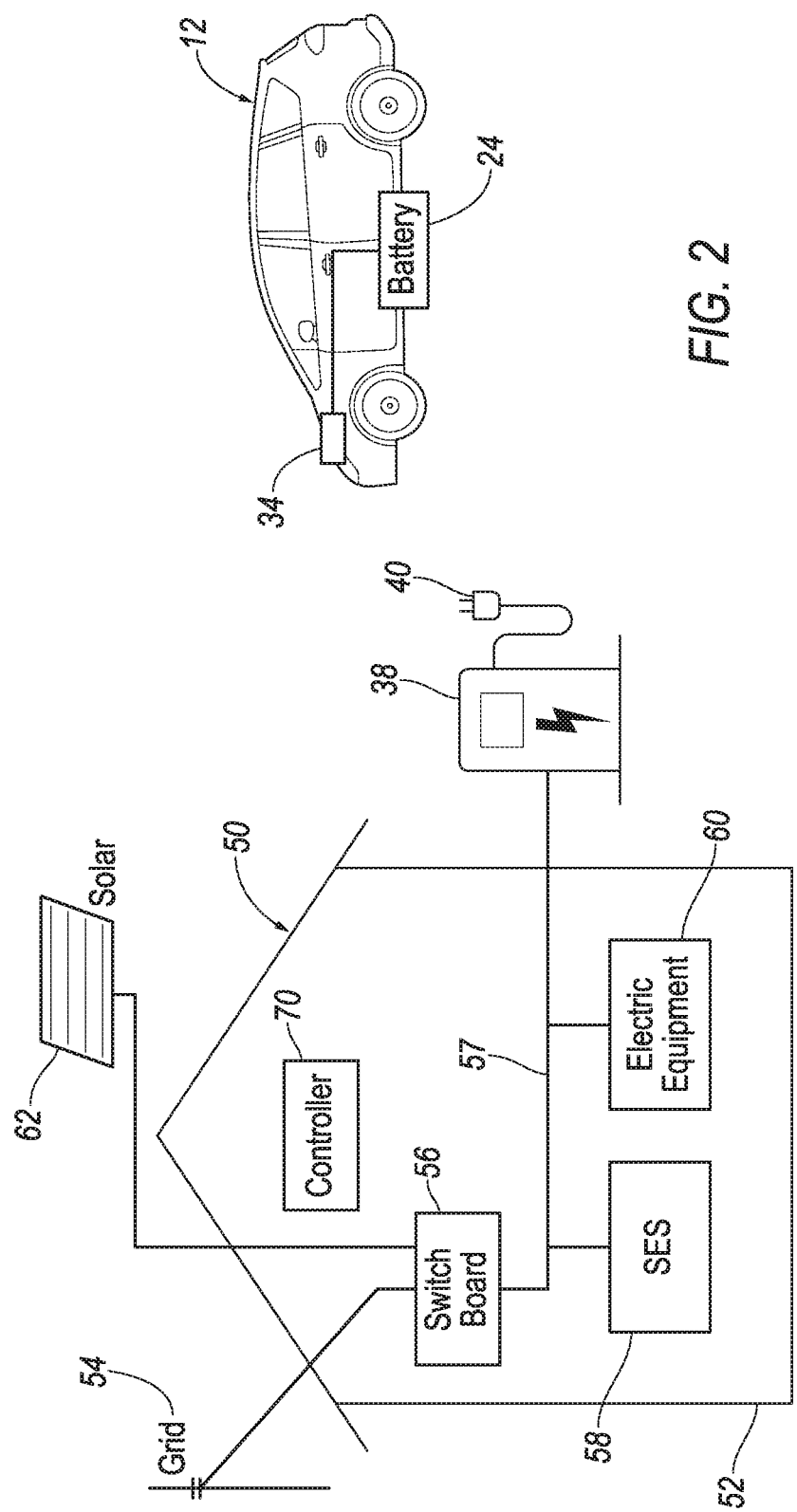
FIG. 2 illustrates a schematic diagram of the EV and an energy facility operative for charging the EV when the EV is at the energy facility, the energy facility having a renewable energy source (e.g., a solar panel assembly) and a stationary energy storage (SES) device (e.g., an onsite battery)

Referring now to FIG. 2, with continual reference to FIG. 1, a schematic diagram of EV 12 and an energy facility 50 are shown. Energy facility 50 functions as an external power source like external power source 36 shown in FIG. 1 and is operative for charging EV 12 when the EV is at the energy facility. In this regard, energy facility 50 may be a charge station and includes EVSE 38 with EVSE connector 40.

Energy facility 50 in the present example is implemented for a house or building ("house") 52. Energy facility 50 accesses electric power from an external power grid 54 via a switch board 56 of the energy facility. Switch board 56 is configured to provide various components of energy facility 50 with electric power via an internal powerline 57. Energy facility 50 may include one or more electric equipment 60 (e.g., one or more appliances) configured to consume electricity in providing various features to house 52.

Energy facility 50 further includes at least one stationary energy storage (SES) device 58. SES device 58 is configured to store electrical energy received via internal powerline 57 from grid 54 and from other sources. SES device 58 is further configured to output its stored electrical energy to internal pipeline 57. SES device 58 may be implemented in various forms. As an example, SES device 58 includes a rechargeable battery (e.g., lithium-ion battery). For ease of reference, SES device 58 will be assumed as being an onsite battery. As the electrical energy may be stored as DC power in onsite battery 58, one or more DC/AC inverters and/or DC/DC converters may be provided for power transitions.

Energy facility 50 further includes at least one renewable energy source 62. As an example, renewable energy source 62 is a solar panel assembly. Solar panel assembly 62 is configured to generate electrical energy from sunlight. Solar panel assembly 62 is connected to switch board 56 to supply electrical energy generated by the solar panel assembly to internal power line 57. In this way, the electrical energy generated by solar panel assembly 62 may be used to charge onsite battery 58, power electric equipment 60, and/or charge traction battery 24 of EV 12. Additionally, or alternatively, the at least one renewable energy source 62 may involve other means of power generating capabilities such as a wind turbine or the like.

With continuing reference to FIG. 2, internal powerline 57 is connected to EVSE 38 which is configured to transfer electric energy with one or more EVs. For simplicity, only one EV 12 is illustrated in FIG. 2. EVSE 38 may be installed within or near house 52 (e.g., in a garage) and adapted to a home electric energy configuration having a predefined voltage and maximum current supported by switch board 56. As discussed with reference to FIG. 1, EVSE 38 is configured to connect to EV 12 via charge port 34 to charge traction battery 24. Additionally, EVSE 38 may be further configured to draw electric power from traction battery 24 to supply electric power to grid 54, SES device 58, and/or electric equipment 60. For instance, in case of a power outage or shortage from grid 54, EVSE 38 may be configured to draw electric power from EV 12 to power electric equipment 60. Additionally, switch board 56 may be configured to draw electric power from solar panel assembly 62, onsite battery 58, and/or traction battery 24 to supply electric power to grid 54.

Energy facility 50 further includes a controller 70 operable for controlling and coordinating the power management of the energy facility. Controller 70 may be a dedicated controller located within house 52 and connected to components of energy facility 50 via wired or wireless connections. Alternatively, controller 70 may be remotely implemented via a cloud server through the Internet and configured to remotely monitor and control the operations of components of energy facility 50. Controller 70 may be provided with software to monitor and control the operations of the various components of energy facility 50. Controller 70 may be provided with an interface associated with input and output devices to interact with a user of energy facility 50. Controller 70 may be connected to a cloud via a public or private network to communicate with other entities such as the utility company and weather agencies to facilitate the planning and controlling of energy facility 50. Controller 70 and controller 48 of EV 12 may be in communication to coordinate operations involving EV 12 and energy facility 50.

As described, energy facility 50 is operable for charging EV 12 and includes a renewable energy source (namely, solar panel assembly 62) and a SES device (namely, onsite battery 58). The energy system of houses, commercial facilities, and other industrial settings including charging depots (collectively labeled "energy facility" for ease of reference) is becoming more complex with the addition of renewable energy sources, SES devices, and charging systems and with a desire to minimize the price of energy to operate the energy facility. An issue is that often times during the day the amount of available renewable energy exceeds the needs for operating the energy facility thereby forcing the excess renewable energy to be curtailed.

For instance, for energy facility 50 with a renewable energy source in the form of solar panel assembly 62, often times during the day the amount of available solar energy exceeds the needs for operating the energy facility. As energy facility 50 includes a SES device in the form of onsite battery 58, excess solar energy can be stored in the onsite battery whenever the onsite battery is not fully charged. However, a limitation with capturing excess solar energy occurs when onsite battery 58 is full or has insufficient storage capacity remaining to capture the full amount of the future excess solar energy.

Figure 3:
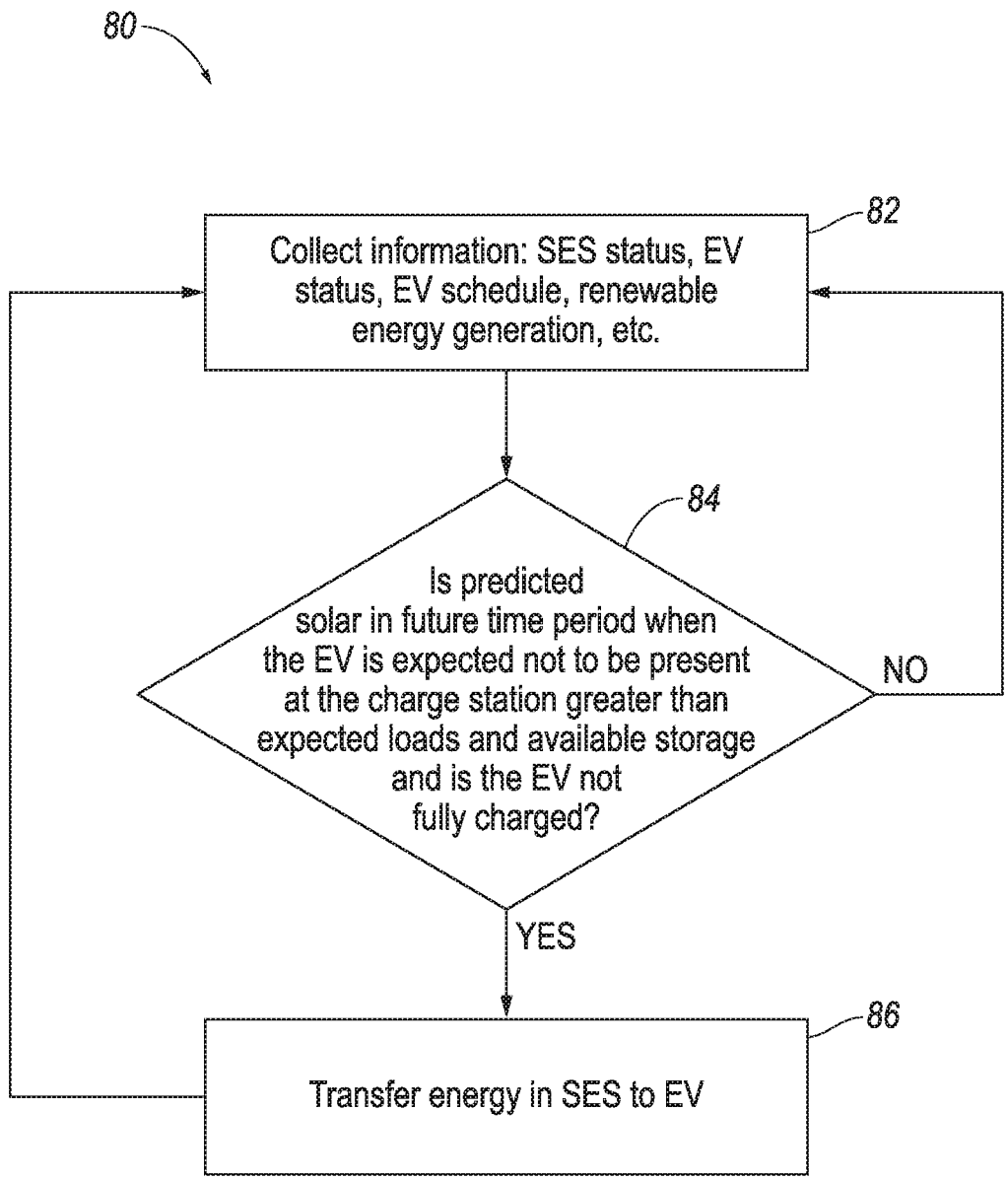
FIG. 3 illustrates a flowchart depicting general operation steps of a method for controlling the energy facility to leverage charging of the EV to increase usage of the renewable energy.

Referring now to FIG. 3, with continual reference to FIG. 2, a flowchart 80 depicting generation operation of a method for controlling energy facility 50 to leverage charging of EV 12 to increase usage of the renewable energy is shown. The method provides a solution to the limitation with capturing excess solar energy when onsite battery 58 is full or has insufficient storage capacity remaining to capture the full amount of the future excess solar energy. The operation steps of the method may be carried out by controller 70 of energy facility 50.

In operation, controller 70 monitors the status of the SES device (e.g., charge and operation status and state-of-charge (SOC) of onsite battery 58), the status of EV 12 (e.g., whether EV 12 is present at energy facility 50 and is connected to EVSE 38, the amount of charge capacity and SOC of traction battery 24, etc.), the schedule of EV 12 in being present and away from energy facility 50, the present and estimated future status of solar panel assembly 62 in renewable energy generation, the present and estimated future load status of electric equipment 60, etc., as indicated by process block 82. Based on the collected information, controller 70 forecasts the future electricity demand for energy facility 50, the amount of renewable energy generation (i.e., solar generation) at the energy facility, and the presence and absence of EV 12 at the energy facility.

At a current time, controller 70 determines for a future time period, during which EV 12 is expected to not be onsite at energy facility 50, whether the predicted solar energy generation is greater than a sum of expected loads of the energy facility and the available storage capacity of onsite battery 58, as indicated by decision block 84. Controller 70 also determines whether EV 12 is fully charged at the current time, as further indicated by decision block 84. At the current time, in response to (i) the predicted solar energy generation for the future time period being greater than the sum of the expected loads of energy facility 50 and the storage capacity of onsite battery 58 for the future time period and (ii) EV 12 being not fully charged, controller 70 controls energy facility 50 to transfer electrical energy from onsite battery 58 to EV 12 while the EV is at the energy facility, as indicated by process block 86.

As such, when (i) the solar energy is predicted to be more than the load for energy facility 50 in a future time period during which EV 12 is not at energy facility 50 and (ii) onsite battery 58 has insufficient capacity to store this energy, the strategy is to move energy from the onsite battery to the EV when the EV is not fully charged and is present at (i.e., connected to) the energy facility. Moving this energy from onsite battery 58 to EV 12 prior to the future time period having excess solar energy will create storage room in onsite battery 58 to store this excessive solar energy during the future time period when the EV is no longer present at the energy facility such as in being driven. With this strategy, the utilization of renewable energy is increased, thereby reducing the amount of electrical energy purchased from grid 54.

This control strategy is suitable for EV charging at home, public charging stations, charging depots, and other business sites. The control strategy can be implemented using either AC or DC charging of EV 12. In addition to controller 70 or alternatively with, the algorithm of the control strategy can be imbedded in onsite battery 58, the cloud, a separate energy management system, or the EV charging management system. Any of the systems that are interfacing to implement this solution can include a portion or all of the algorithm.

Figure 4:
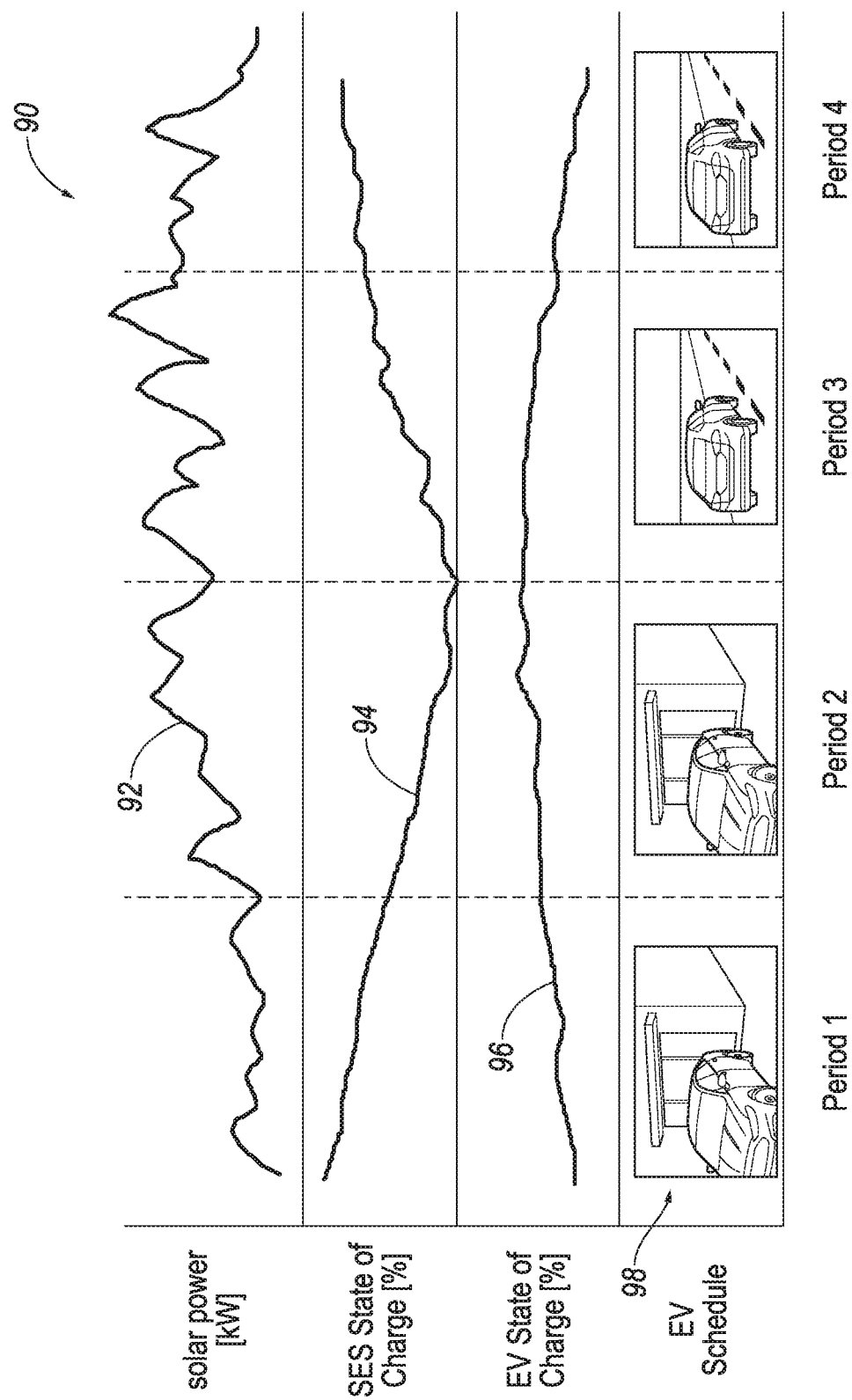
FIG. 4 illustrates a graph depictive of exemplary electrical energy flow of the energy facility over time in operation of being controlled to leverage charging of the EV to increase usage of the renewable energy.

Referring now to FIG. 4, with continual reference to FIGS. 2 and 3, a graph 90 depictive of exemplary electrical energy flow of energy facility 50 over time (e.g., a 24-hour day) in operation of being controlled to leverage charging of EV 12 to increase usage of the renewable energy is shown. Graph 90 includes a plot 92 indicative of the solar power generation by solar panel assembly 62 of energy facility 50 throughout the day, a plot 94 indicative of the charge capacity of onsite battery 58 of energy facility 50 throughout the day, and a plot 96 of the charge capacity of traction battery 24 of EV 12 throughout the day. Graph 90 further includes legends 98 depictive of the presence and absence of EV 12 at energy facility 50 during different periods of the day. For instance, four exemplary periods of the day are illustrated in FIG. 4 with EV 12 being present at energy facility 50 during Periods 1 and 2 and being away from the energy facility during Periods 3 and 4. Plots 92, 94, and 96 are plotted over the four exemplary periods of the day.

In Period 1, the system (e.g., controller 70 of energy facility 50) collects information from onsite battery 58 and EV 12 and predicts the future loads of electric equipment 60, the future amount of solar energy generated by solar panel assembly 62, and the presence/away schedule for EV 12. At the beginning of Period 1, onsite battery 58 is nearly fully charged as indicated by plot 94 and traction battery 24 of EV 12 is not fully charged as indicated by plot 96. EV 12 is expected to leave home in Period 3 when it is predicted that solar energy available will be larger than the loads, i.e., excessive solar energy will be available in Period 3. After collecting the information, controller 70 determines an opportunity to capture more of the excess solar energy by charging traction battery 24 of EV 12 during Periods 1 and 2 with energy stored in onsite battery 58. A goal is to vacate a sufficient amount of storage room in onsite battery 58 to capture the excessive solar energy when EV 12 leaves energy facility 50. In the beginning of each period, the system collects new information and performs a new forecast to optimize the renewable energy capture and use.

The charging power is determined by multiple factors, for example, how much excessive renewable energy needs to be captured, when EV 12 is available for charging, the target state-of-charge (SOC) of traction battery 24 of the EV, the accuracy and capability of renewable energy prediction, etc.

There are various ways to determine the charging power from onsite battery 58 to EV 12. One example to determine the charging power is to make sure onsite battery 58 reserves enough storage room to capture all or a majority of the excessive renewable energy generated in the future by solar panel assembly 62 after EV 12 leaves energy facility 50. The charging power may be calculated with the following Equations (1) and (2):

$$P_{EV_{charging}}[k] \leq \text{minimum}\left(\frac{E_{excessive\_solar}[k]}{mT_s}, \frac{\{1 - SOC_{EV}[k]\} \cdot C_{EV}}{mT_s}\right) \quad (1)$$

$$E_{excessive\_solar}[k] = \sum_{n=k+m}^{k+w} (P_{solar}[n] - P_{load}[n]) \cdot T_s \quad (2)$$

$E_{excessive\_solar}[k]$ represents the cumulative excessive solar energy between time instant [k+m] and [k+w] when EV 12 is no longer on site at energy facility 50; $T_s$ represents the sampling rate of the system; $SOC_{EV}[k]$ represents the current SOC of traction battery 24 of EV 12; and $C_{EV}$ represents the capacity of traction battery 24 of EV 12.

Another goal is to meet the EV charging target before EV 12 leaves energy facility 50. The charging power is calculated in Equation (3):

$$P_{EV_{charging}}[k] \geq \frac{\{\overline{SOC}_{EV} - SOC_{EV}[k]\} \cdot C_{EV}}{mT_s} \quad (3)$$

$\overline{SOC}_{EV}$ represents the target SOC level (ratio of energy capacity used) when EV 12 leaves energy facility 50 at time instant [k+m].

Figure 5:
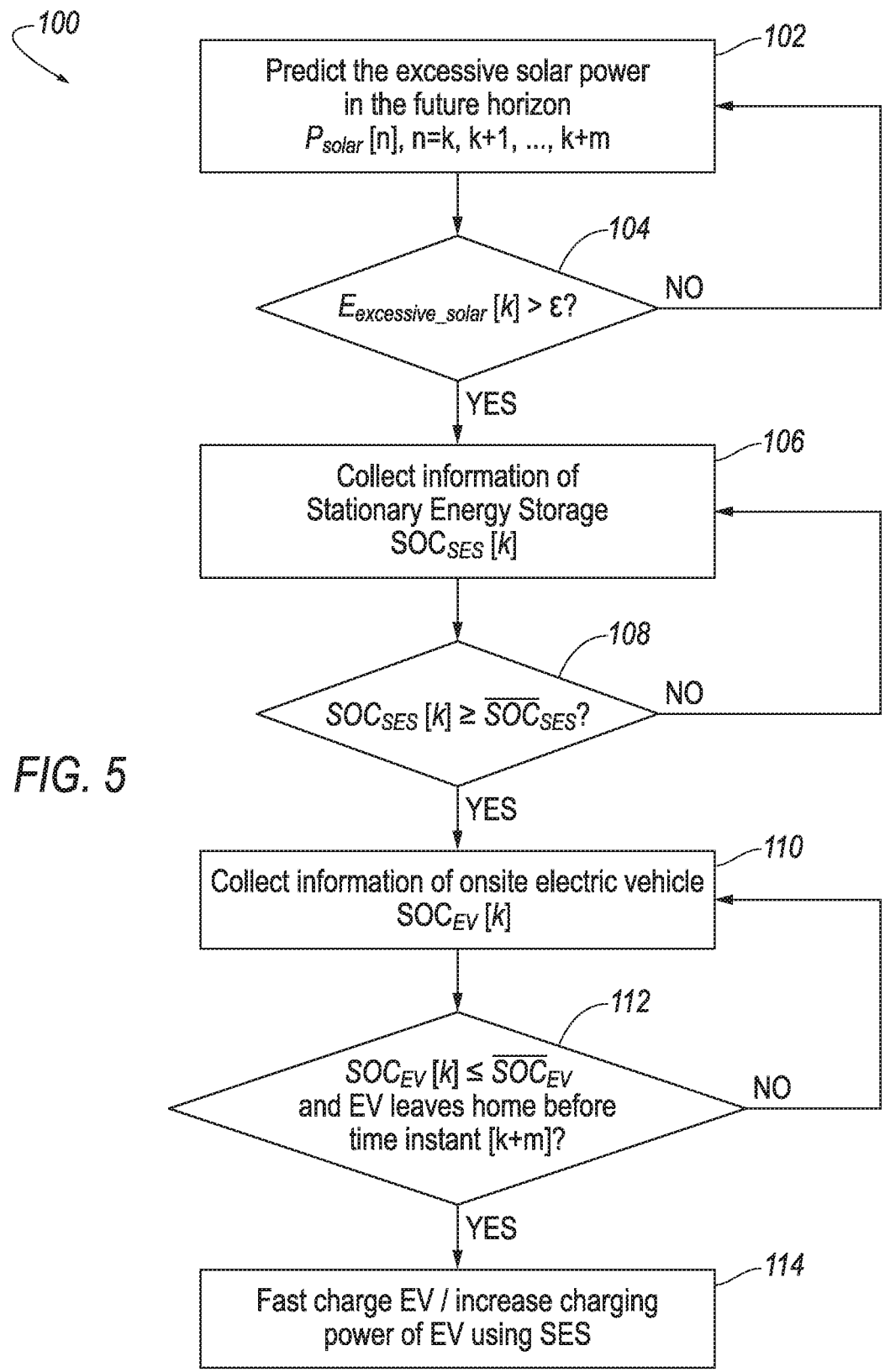
FIG. 5 illustrates a flowchart depicting more detailed operation steps of the method for controlling the energy facility to leverage charging of the EV to increase usage of the renewable energy.

Referring now to FIG. 5, with continual reference to FIGS. 2, 3, and 4, a flowchart 100 depicting more detailed operation steps of the method for controlling energy facility 50 to leverage charging of EV 12 to increase usage of the renewable energy is shown. Flowchart 100 corresponds to the calculation of the charging power described above. The operation steps of the method may be carried out by controller 70 of energy facility 50.

In operation, at a current time, controller 70 predicts the excessive solar in a future time period (future horizon), as indicated by process block 102. Controller 70 then compares the predicted excessive solar ($E_{excessive\_solar}[k]$) to a power threshold (c) indicative of the expected loads of energy facility 50, as indicated in decision block 104. When the predicted excessive solar exceeds the power threshold, controller 70 collects information of onsite battery 58, as indicated in process block 106. Namely, controller 70 collects information ($SOC_{SES}[k]$) indicative of the current SOC of onsite battery 58. Controller 70 then compares the current SOC of onsite battery 58 ($SOC_{SES}[k]$) with a target SOC ($\overline{SOC}_{SES}$) of onsite battery 58, as indicated by decision block 108.

When the current SOC of onsite battery 58 is greater than the target SOC of onsite battery 58, controller collects information of EV 12, as indicated by process block 110. Namely, controller 70 collects information ($SOC_{EV}[k]$) indicative of the current SOC of traction battery 24 of EV 12. Controller 70 then (a) compares the current SOC of traction battery 24 of EV 12 ($SOC_{EV}[k]$) with a target SOC ($\overline{SOC}_{EV}$) of traction battery 24 of EV 12 and (b) checks whether EV 12 is expected to leave energy facility 50 by the beginning of the future time period, as indicated by decision block 112. When the current SOC of traction battery 24 of EV 12 is less than the target SOC of the traction battery (i.e., when EV 12 is not fully charged) and when EV 12 is expected to leave energy facility 50 by the beginning of the future time period (i.e., when EV 12 is expected not to be present at energy facility 50 during the future time period), controller 70 causes energy facility 50 to charge traction battery 24 of the EV with electrical energy from onsite battery 58, as indicated by process block 114.

As described, the present disclosure provides a method for controlling an energy facility, operable for charging an EV and having a renewable energy source and a SES device, to leverage charging of the EV to increase usage of the renewable energy. A benefit is to increase the renewable energy usage onsite with existing infrastructure. Moreover, the charging could be conducted using either DC or AC charging. When the SES device has the capability to provide DC charging to the EV, the charging power is also decoupled from the charging limit of onboard charger of the EV.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A charge station comprising:
   a controller configured to charge at a current time an electrified vehicle (EV) present at the charge station with electricity stored in an onsite battery of the charge station in response to an amount of renewable energy expected to be available at the charge station at a future time during which the EV is expected to be absent from the charge station exceeding an available electricity storage capacity of the battery.

2. The charge station of claim 1 wherein:
   the controller is further configured to charge at the current time the EV with electricity stored in the onsite battery in response to the amount of renewable energy expected to be available exceeding the available electricity storage capacity of the onsite battery summed with an amount of electricity expected to be provided by the charge station to other loads at the future time.

3. The charge station of claim 1 wherein:
the controller is further configured to charge at the current time the EV with electricity stored in the onsite battery in response to the amount of renewable energy expected to be available exceeding the available electricity storage capacity of the onsite battery summed with an amount of electricity expected to be provided by the charge station to other loads at the future time and a state-of-charge (SOC) of the onsite battery at the current time being greater than a target SOC of the onsite battery.

4. The charge station of claim 1 wherein:
the controller is further configured to charge at the current time the EV with electricity stored in the onsite battery in response to the amount of renewable energy expected to be available exceeding the available electricity storage capacity of the onsite battery and the EV being not fully charged.

5. The charge station of claim 1 wherein:
the controller is further configured to charge at the current time the EV with electricity stored in the onsite battery in response to the amount of renewable energy expected to be available exceeding the available electricity storage capacity of the onsite battery and a state-of-charge (SOC) of the EV at the current time being less than a target SOC of the EV.

6. The charge station of claim 1 wherein:
the controller is further configured to charge at the current time the EV with electricity stored in the onsite battery in response to the amount of renewable energy expected to be available exceeding the available electricity storage capacity of the onsite battery and a state-of-charge (SOC) of the EV at the current time being less than a target SOC of the EV and a SOC of the onsite battery at the current time being greater than a target SOC of the onsite battery.

7. An energy facility comprising:
a renewable energy generator for generating electrical energy from a renewable energy source;
an energy storage device for storing electrical energy generated by the renewable energy generator; and
a controller configured to charge at a current time a traction battery of an electrified vehicle (EV) present at the energy facility with electrical energy stored in the energy storage device in response to an amount of electrical energy expected to be generated by the renewable energy generator at a future time during which the EV is expected to not be present at the energy facility exceeding an available electrical energy storage capacity of the energy storage device.

8. The energy facility of claim 7 wherein:
the controller is further configured to charge at the current time the traction battery of the EV with electrical energy stored in the energy storage device in response to the amount of electrical energy expected to be generated by the renewable energy generator exceeding the available electrical energy storage capacity of the energy storage device summed with an amount of electrical energy expected to be provided by the energy facility to other loads at the future time.

9. The energy facility of claim 7 wherein:
the controller is further configured to charge at the current time the traction battery of the EV with electrical energy stored in the energy storage device in response to the amount of electrical energy expected to be generated by the renewable energy generator exceeding the available electrical energy storage capacity of the energy storage device summed with an amount of electrical energy expected to be provided by the energy facility to other loads at the future time and a state-of-charge (SOC) of the energy storage device at the current time being greater than a target SOC of the energy storage device.

10. The energy facility of claim 7 wherein:
the controller is further configured to charge at the current time the traction battery of the EV with electrical energy stored in the energy storage device in response to the amount of electrical energy expected to be generated by the renewable energy generator exceeding the available electrical energy storage capacity of the energy storage device and a state-of-charge (SOC) of the energy storage device at the current time being greater than a target SOC of the energy storage device.

11. The energy facility of claim 7 wherein:
the controller is further configured to charge at the current time the traction battery of the EV with electrical energy stored in the energy storage device in response to the amount of electrical energy expected to be generated by the renewable energy generator exceeding the available electrical energy storage capacity of the energy storage device and the traction battery of the EV being not fully charged.

12. The energy facility of claim 7 wherein:
the renewable energy generator is a solar panel assembly with the renewable energy source being solar power; and
the energy storage device is an onsite battery.

13. The energy facility of claim 7 wherein:
the controller is further configured to charge at the current time the traction battery of the EV with electrical energy stored in the energy storage device in response to the amount of electrical energy expected to be generated by the renewable energy generator exceeding the available electrical energy storage capacity of the energy storage device and a state-of-charge (SOC) of the traction battery of the EV at the current time being less than a target SOC of the traction battery of the EV and a SOC of the energy storage device at the current time being greater than a target SOC of the energy storage device.

14. The energy facility of claim 7 wherein:
the renewable energy generator is a solar panel assembly with the renewable energy source being solar power.

15. The energy facility of claim 7 wherein:
the energy storage device is an onsite battery.

16. A method of operating an energy facility having a renewable energy generator for generating electrical energy from a renewable energy source and an energy storage device for storing electrical energy generated by the renewable energy generator, the method comprising:
charging at a current time a traction battery of an electrified vehicle (EV) present at the energy facility with electrical energy stored in the energy storage device in response to an amount of electrical energy expected to be generated by the renewable energy generator at a future time during which the EV is expected to not be present at the energy facility exceeding an available electrical energy storage capacity of the energy storage device.

17. The method of claim 16 further comprising:
charging at the current time the traction battery of the EV with electrical energy stored in the energy storage device in response to the amount of electrical energy expected to be generated by the renewable energy generator exceeding the available electrical energy storage capacity of the energy storage device summed with an amount of electrical energy expected to be provided by the energy facility to other loads at the future time.

18. The method of claim 16 further comprising:
charging at the current time the traction battery of the EV with electrical energy stored in the energy storage device in response to the amount of electrical energy expected to be generated by the renewable energy generator exceeding the available electrical energy storage capacity of the energy storage device summed with an amount of electrical energy expected to be provided by the energy facility to other loads at the future time and a state-of-charge (SOC) of the energy storage device at the current time being greater than a target SOC of the energy storage device.

19. The method of claim 16 wherein:
the renewable energy generator is a solar panel assembly, and the renewable energy source is solar power.

20. The method of claim 16 wherein:
the energy storage device is an onsite battery.

\* \* \* \* \*